March 8, 1932.                L. M. OAKLEY                1,849,026
                     RUBBER SOLE FOR BOOTS AND SHOES
                        Original Filed Dec. 14, 1927
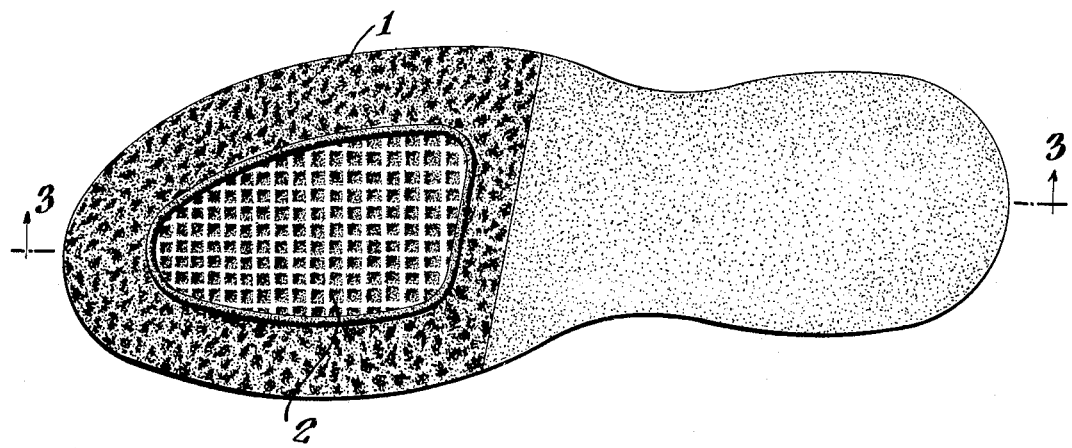
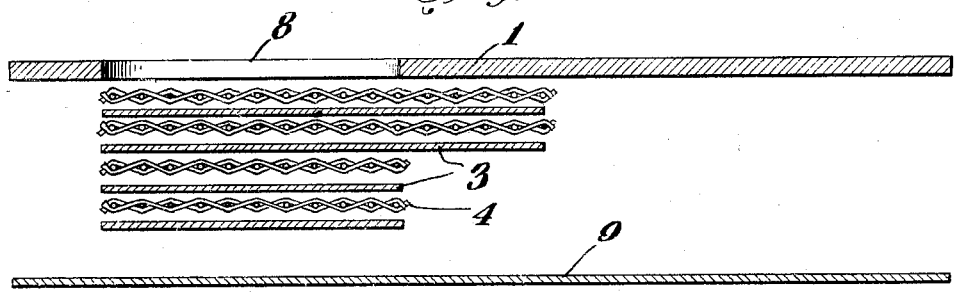
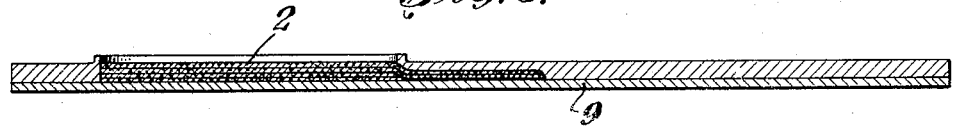
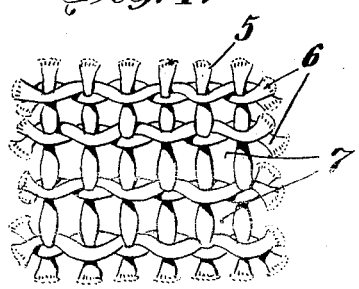

Patented Mar. 8, 1932

1,849,026

UNITED STATES PATENT OFFICE

LAURENCE M. OAKLEY, OF TRENTON, NEW JERSEY, ASSIGNOR TO ESSEX RUBBER COMPANY, INC., OF TRENTON, NEW JERSEY, A CORPORATION OF NEW JERSEY

RUBBER SOLE FOR BOOTS AND SHOES

Application filed December 14, 1927, Serial No. 239,876. Renewed January 4, 1930.

This invention relates to rubber soles for boots and shoes.

It is an object of the invention to incorporate textile fabric in soles in such manner as to reenforce the same and to provide a tread surface having anti-slip properties, and to extend the said fabric beyond the immediate area of the tread surface in order to provide reenforcement at points where separation or cracking is likely to occur due to repeated flexing.

Other objects and advantages of the invention will appear hereinafter.

A preferred embodiment of the invention selected for purposes of illustration is shown in the accompanying drawings, in which, Figure 1 is a top plan view of a sole.

Figure 2 is an exploded longitudinal sectional view.

Figure 3 is a longitudinal sectional view on the line 3—3 of Figure 1 showing the relation of the parts after vulcanization, and Figure 4 is an enlarged detail view of the textile fabric.

Referring to the drawings, the sole illustrated comprises, in general, the body portion 1 and a central tread portion 2. The body portion may comprise a sheet of rubber calendered to the desired thickness and died out to the desired shape. The central tread portion, on the other hand, comprises plies of sheet rubber and textile fabric 3 and 4 respectively, arranged to lie in planes parallel to the plane of the tread surface of the sole. Preferably the plies of rubber are relatively thin and are arranged alternately with the plies of textile fabric, several layers being preferably provided in order that as soon as one ply of fabric is worn away, another ply may be exposed.

The textile fabric may preferably be of the loose weave open mesh type, the particular fabric illustrated herein being of the type commonly used to form the "breaker strip" in rubber tire construction. As illustrated, the said fabric comprises single transverse strands 5 and double longitudinal strands 6, the longitudinal strands being twisted in such manner as to hold the transverse strands therebetween. Both the transverse strands and the pairs of longitudinal strands are preferably spaced apart at distances sufficient to provide apertures 7 of substantial size in the finished fabric. Preferably the said fabric may be coated or impregnated with a rubber cement which aids in bonding the strands to the rubber during the vulcanization process.

It has been discovered that in many rubber soles there is a tendency for the rubber to crack or separate at a point approximately midway between the ball of the foot and the shank of the sole. This tendency is thought to be due to the fact that the sole is subjected repeatedly to severe flexing at this point, and also that during flexing the outer surface of the sole is under tension tending to cause separation. According to the present invention it is proposed to reenforce this portion of the sole by extending some or all of the plies of textile fabric rearwardly beyond the immediate area of the tread surface, and into the area where such separation ordinarily occurs. In the preferred embodiment illustrated in the drawings only the two outer plies of fabric are extended rearwardly as this has been found to provide sufficient reenforcement for ordinary purposes.

Preferably the body portion of the sole is died out to form an aperture 8 of a size and shape substantially equal to the size and shape of the central tread portion of the finished sole. A backing strip 9 of rubber or textile fabric is also provided, and in assembling the sole, the plies of textile fabric together with their alternate plies of rubber are placed upon the backing strip 9 and the body portion may then be laid over the backing strip in such manner that the major portion of the plies of rubber and fabric register with and lie within the aperture 8. As will be observed, however, the rearwardly extending portions of the fabric lie beneath the body portion of the sole and between the body portion and the backing strip, so that in the finished sole these portions lie well beneath the surface of the sole.

During the process of vulcanization the pressure applied causes the rubber of the thin rubber plies to penetrate into all of the apertures and interstices of the textile fabric, so that in effect the thin rubber plies become a binder and filler for the closely compacted plies of fabric. The central tread surface which is originally presented, therefore, is largely rubber with the strands of fabric appearing at or slightly embedded in the surface. Due to the large proportion of rubber surface presented as compared with fabric surface the sole exhibits substantially the same resistance to abrasive wear as an all rubber sole, but the presence of the fabric strands aids in preventing slipping. Furthermore, due to the fact that the strands of the fabric lie in the plane of the sole and extend both longitudinally and transversely through the sole, a substantial reenforcement is provided within the central tread area which aids in preventing spreading,—that is, the gradual displacement of rubber under repeated impact, and also aids in preventing cracking which results from repeated flexing.

Due to the fact that some of the plies of fabric are extended rearwardly into the area where separation most frequently occurs, the said areas receive substantial reenforcement from the fabric which aids in preventing separation at this point.

As the sole wears down, as soon as the strands of one fabric ply wear out, or in some cases even before they are completely worn out, the strands of the next ply begin to appear, the plies of rubber being sufficiently thin that there is no substantial stratum of rubber between the plies of fabric after vulcanization.

Furthermore, if the sole is used under conditions which cause unusual wear at the areas to the rear of the usual tread surface of the sole, as for example, in walking on cinders, climbing the rungs of ladders, riding bicycles, etc., the fabric plies will become exposed in the course of time as the outer covering of rubber wears away and will perform an anti-slip function.

It will be understood that the invention may be variously modified and embodied within the scope of the subjoined claim.

I claim as my invention:

A rubber sole having a tread embedded therein beneath the ball of the foot, said tread comprising a plurality of plies of rubber and loose mesh textile material arranged alternately and lying in planes parallel to the plane of the sole, certain of said plies being extended rearwardly beyond the tread and beneath the surface of the sole to reenforce the area of rubber to the rear of the tread surface against separation.

In testimony whereof, I have signed my name to this specification this seventh day of December, 1927.

LAURENCE M. OAKLEY.